(12) United States Patent
Hawk et al.

(10) Patent No.: US 7,097,025 B2
(45) Date of Patent: Aug. 29, 2006

(54) SYSTEM FOR REMOVING DEAD ANIMALS

(76) Inventors: John M. Hawk, 6641 Bates Pike SE., Old Fort, TN (US) 37362; Hugh Wilkins, 1397 Fire Tower Rd. SE., Fairmount, GA (US) 30139

( * ) Notice: Subject to any disclaimer, the term of this patent is extended or adjusted under 35 U.S.C. 154(b) by 0 days.

(21) Appl. No.: 10/886,362

(22) Filed: Jul. 7, 2004

(65) Prior Publication Data

US 2004/0245074 A1 Dec. 9, 2004

Related U.S. Application Data

(62) Division of application No. 10/457,156, filed on Jun. 9, 2003.

(51) Int. Cl.
*B65G 17/32* (2006.01)

(52) U.S. Cl. .................... 198/680; 198/678.1; 452/183

(58) Field of Classification Search ............. 198/678.1, 198/680; 452/183
See application file for complete search history.

(56) References Cited

U.S. PATENT DOCUMENTS

| | | | |
|---|---|---|---|
| 2,685,360 A * | 8/1954 | Kaplan | 452/180 |
| 3,042,186 A * | 7/1962 | Varney | 198/477.1 |
| 3,166,785 A * | 1/1965 | Lemmond | 452/183 |
| 3,298,500 A * | 1/1967 | Jensen | 198/680 |
| 3,380,113 A * | 4/1968 | Zebarth et al. | 452/183 |
| 3,507,009 A * | 4/1970 | Comly | 425/345 |
| 3,510,909 A * | 5/1970 | Herzog | 452/183 |
| 3,708,829 A * | 1/1973 | Klevgard | 452/183 |
| 4,020,793 A * | 5/1977 | Morrison | 119/479 |
| 4,195,386 A * | 4/1980 | Dodd | 452/183 |
| 4,372,009 A * | 2/1983 | Linville | 452/183 |
| 4,413,376 A * | 11/1983 | Linville | 452/183 |
| 4,498,578 A * | 2/1985 | Altenpohl | 198/680 |
| 5,098,333 A * | 3/1992 | Cobb | 452/106 |
| 5,105,933 A | 4/1992 | Gough | |

* cited by examiner

*Primary Examiner*—Patrick Mackey
(74) *Attorney, Agent, or Firm*—Laurence P. Colton; Powell Goldstein LLP

(57) ABSTRACT

A system for transporting dead animals in an animal raising facility to a disposal site using a conveyor having at least one carrier that operates by placing the dead animals in the carrier, transporting the carrier towards a disposal site by the conveyor, and emptying the carrier at the disposal site.

3 Claims, 11 Drawing Sheets

SYSTEM FOR REMOVING DEAD ANIMALS

STATEMENT OF RELATED APPLICATIONS

This patent application is a divisional patent application of and claims priority on U.S. patent application Ser. No. 10/457,156 having a filing date of 9 Jun. 2003, currently pending.

BACKGROUND OF THE INVENTION

1. Technical Field

The present invention relates generally to the field of raising animals and more particularly to methods for removing dead animals from animal raising houses such as chicken coops. The present invention further relates to conveyors for use in removing dead animals from animal raising houses such as a chicken coop and more particularly to system and method for transporting dead animals within an animal house to a central disposal site.

2. Prior Art

Commercial poultry, such as turkeys, chickens, ducks, and geese have been a main food source throughout history. For hundreds of years, poultry had been raised and processed on small family farms to be locally sold to buyers. However, as the human population increased, the demand for poultry has increased. As a result of this increased demand for poultry, the production of commercially raised poultry has evolved from small family farm operations to large business operations devoted solely to the production of such animals. These large factory farms commonly raise several million animals each year. Without such farms, the demand for such animals could not be met. While the technology for processing such animals has evolved dramatically, the methods and apparatus for raising animals have remained relatively unchanged. In fact, many factory farms today use the same general methods and apparatus previously used on smaller farms, but on a far larger scale.

In any animal raising site, animals are going to die during the raising process for any number of reasons. Although the job of removing dead animals from the site may be difficult and is time consuming and physically strenuous, the removal of dead animals from a site is one of the most important activities in maintaining a healthy environment on factory farms. In fact, dead poultry remaining within the flock in a chicken coop for prolonged periods of time can increase the growth of bacteria such *botulism, salmonella* and *camplylobacter* among the batch. While feeding and watering are often automated, a crew of workers often accomplishes the removal of dead poultry manually.

Human labor usually is required to manually locate and transport the dead poultry within the coop to a disposal site away from the coop. Typically, human labor walks through the coop, picks up any dead animals, and carries the dead animals to a central pile, or disposes of the dead animals through a door in the coop. Humans can only carry so many dead animals at one time, in terms of both weight and cumbersomeness. Complicating matters further, the distance from the site of the dead poultry and the disposal site can be substantially far apart, as many modern chicken coops can be hundreds of feet long. In fact, as animal raising houses can be large in square feet, the crew of workers often is forced to walk a great distance to dispose of dead animals. As such, it can take a significant amount of time and energy to walk from the dead animal site to the disposal site.

Accordingly, there is a need for an improved system and method for transporting dead animals within an animal raising facility to a disposal site within the facility or outside of the facility. Such a system and method should be more efficient and reduce the time it takes to remove the dead animal from a facility and dispose of it at a disposal site. The present invention is directed to this need and other related needs.

BRIEF SUMMARY OF THE INVENTION

Briefly, the present invention is a system and method for transporting dead animals from an animal raising house or facility, such as for illustrative purposes a chicken coup, to a disposal site for dead animals. One embodiment of the present invention is a system comprising a conveyor movable around a raceway, a plurality of carriers attached to and depending from a chain or belt forming the basis of the conveyor, and a disposal site. The raceway is suspended from the ceiling of the animal house at a height that both will not interfere with the day-to-day activities of the resident animals and is convenient for the human workers to utilize. The raceway can be a continuous circuit located approximately halfway between the central point and the outer walls of the animal raising facility so as to be most accessible to the human workers. Alternatively, two or more raceways can be strategically located throughout the animal raising facility so as to provide convenient access to the human workers.

The carriers are secured to the conveyor so to form a continuous chain of carriers that are able to circulate around a closed loop of the conveyor. The chain or belt can be a common motorcycle or bicycle chain, a rubber or reinforced rubber belt similar to the fan belt material used in the automotive industry, Nylon® or other polymer belts (e.g. ultra high molecular weight polymers belts), steel or other metal or polymer cables or ropes, and the like. The carriers are pivotably or swivelly attached to the chain or belt and generally depend downward from the chain or belt towards the ground or floor of the animal facility. Each carrier is capable of holding at least one dead animal and dumping the dead animal over or into the disposal site. After the carrier dumps the dead animal at the disposal site, the carrier can be re-circulated around the conveyor for further use.

The disposal site can be any of a number of structures or features. For example, the disposal site can be a dumpster located within the animal raising facility, a conveyor originating within the animal raising facility and terminating outside of or at an opening to the outside of the animal raising facility, or completely outside of the animal raising facility if the raceway is designed to exit the animal raising facility for dumping the dead animals. All that is required is that the disposal site be conveniently or centrally located and be able to accept the dumping of dead animals.

Another embodiment of the present invention comprises a method for transporting dead animals from an animal raising facility to a disposal site. This embodiment according to the present invention comprises placing the dead animal in one of the carriers secured to a conveyor, using the conveyor to transport the carrier with the dead animal to the disposal site, and allowing the carrier with the dead animal to empty the dead animal at the disposal site. Preferably, the carrier then re-circulates around the conveyor once it has emptied the dead animal at the disposal site.

In operation and use, the system and method serve to transport dead animals from an animal raising facility such as a chicken coup to a disposal site or bin. More particularly, as a worker finds a dead animal, the worker places the dead animal into one of the circulating carriers, which then travels along the conveyor until it reaches the deposal site. Once at the disposal bin, the carrier is emptied and the dead animal is dumped into the disposal site. After dumping the dead animal at the disposal site, the carrier circulates along the conveyor. As the user does not need to transport the dead animal to the disposal site, a user's time and energy is saved.

These features and other features and advantages of the present invention will become more apparent to those of ordinary skill in the relevant art when the following detailed description of the preferred embodiments is read in conjunction with the appended drawings in which like reference numerals designate like components throughout the several views.

PREFERRED EMBODIMENTS OF THE PRESENT INVENTION

Illustrative embodiments of system and method, and apparatuses and devices used to make up the system and carry out the method, according to the present invention are shown in FIGS. 1 through 7. Although system 5 is shown in the figures in connection with a chicken coop as the illustrative animal raising facility 7, it is understood that system 5 may be used in connection with any animal raising facility 7 and with any type of small commercially raised animal, including chickens, geese, ducks, turkeys or the like. While the invention is described herein in conjunction with the preferred embodiments, it will be understood that the invention is not limited to these embodiments. Further, it is contemplated that the invention can be scaled up or down to handle larger or smaller animals, respectively.

Figure 1:
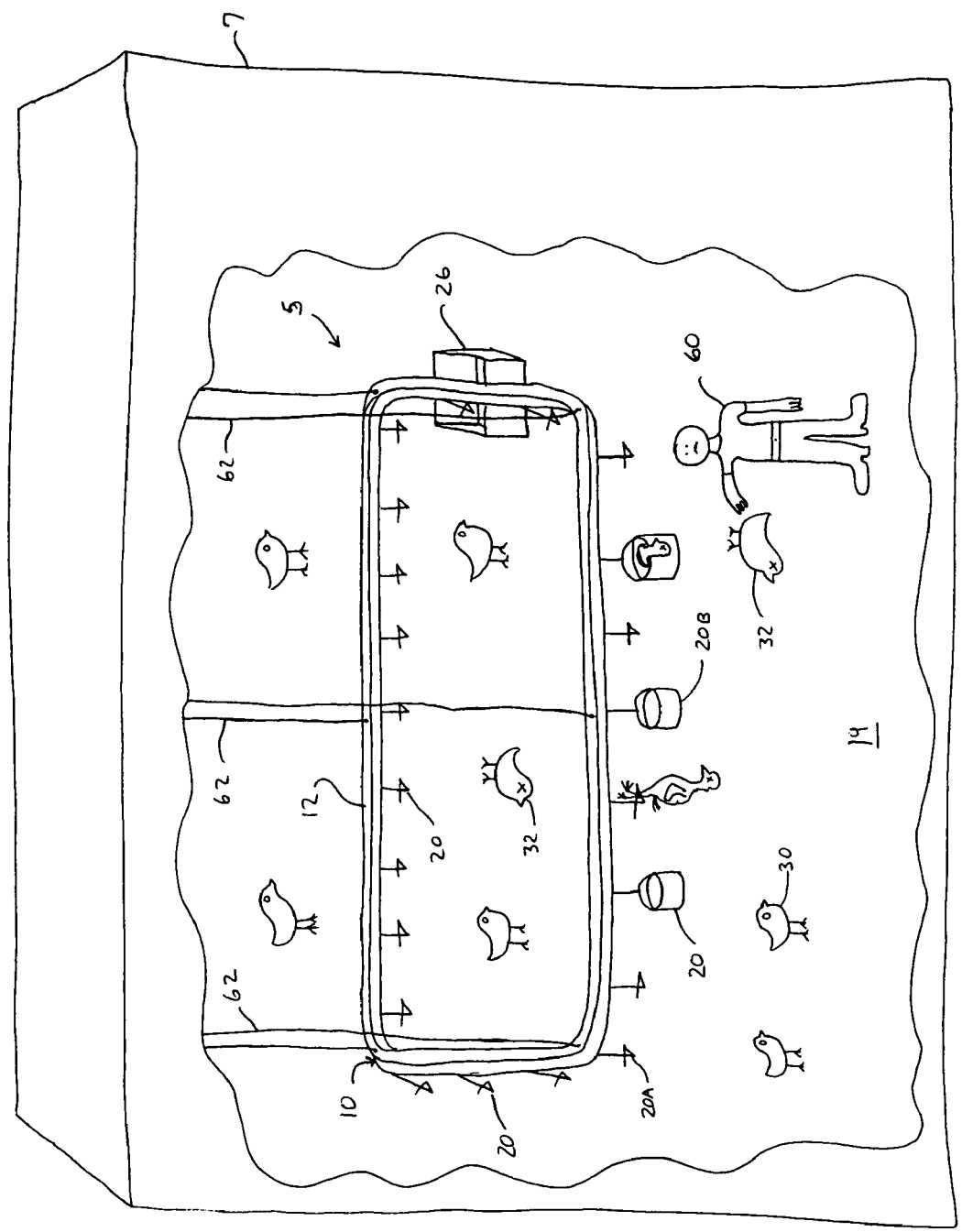
FIG. 1 is a perspective view of one illustrative embodiment of the present invention.

FIG. 1 is an illustrative perspective view of the system 5. The system 5 comprises conveyor 10 and carriers 20. Conveyor 10 comprises a frame or raceway 12 having a horizontal operating platform and mode. Raceway 12 cooperates with and supports a continuous conveyor chain or belt 56 either within an internal channel 58 or by other means. Carriers 20 are attached to and depending from chain or belt 56. Preferably, there is a plurality of carriers 20 spaced generally evenly along chain or belt 56. Chain or belt 56 is driven by a motor (not shown) about raceway 12. As chain or belt 56 is driven around raceway 12, conveyor 10 functions as a guide for carriers 20, thus carrying carriers 20 in a loop about animal raising facility 7.

Workers 60, human or robotic, traverse the animal raising facility 7 looking for dead animals 32. Once a dead animal 32 is found the dead animal 32 is placed on a carrier 20. Chain or belt 56 is driven about raceway 12 preferably at a constant speed slow enough for worker 60 to be able to comfortably place dead animal 32 on carrier 20, yet fast enough such that worker 60 does not have to wait a prolonged period of time for the next carrier 20 to arrive. Alternatively, having a multitude of carriers 20 also can help prevent prolonged waiting periods. Conveyor 10 then carries dead animal to disposal site 26 where the dead animal is removed from carrier 20 and disposed of. Conveyor 10 serves to provide a controlled path within the animal raising facility 7, serves to constrain the movement of carriers 20 in both the vertical and lateral directions, and also forms a continuous chain of carriers 20 that can be circulated around the closed loop of conveyor 10.

Conveyor 10 sequentially dumps the content of each of carrier 20 over or into disposal site 26, which is located strategically within or throughout animal raising facility 7. More particularly, as carriers 20 are capable of carrying dead animal 32, conveyors 10 can sequentially dump dead animals 32 over or into disposal site 26. Then, preferably, after the content of each of carrier 20 is sequentially dumped over or into disposal site 26, carriers 20 are re-circulated around conveyor 10 and therefore around animal raising facility 7 and can be reused or refilled with another dead animal 32.

Conveyor 10 is suspended from the ceiling of animal raising facility 7 in much the same way known animal drinking systems are suspended. More particularly, conveyor 10 is suspended by suspension cables 62 or other types of tension or suspension devices such as steel wires from the roof support beams or other support devices located above the system 5 and/or along the roof of the animal raising facility 7. Alternatively, conveyor 10 can be supported from below using columns, trusses or other such structural support devices (not shown). One useful option is to make conveyor height adjustable such that conveyor 10 can be raised upwards and out of the way when the animal raising facility, for example, is to be cleaned, and can be lowered to the ground or floor 19 when the system 5 needs to be maintained or repaired. The conveyor 10 preferably is suspended from the ceiling of the animal raising facility 7 at a height that both will not interfere with the day-to-day activities of the resident animals 30 and is convenient for the workers 60 to utilize.

In the illustrative embodiment of FIG. 1, two different types of carrier 20 are shown. One type, shown in more detail in FIG. 3 and disclosed in more detail below, is a hanger of the crotch carrier 20A style. Another type, shown in more detail in FIG. 5 and disclosed in more detail below, is a bucket carrier 20B. The system 5 can utilize many different types of carrier 20 and is not limited to these two illustrative embodiments. Further, the system can utilize a single type of carrier 20, such as only crotch carrier 20A, or a combination of different types of carriers 20, such as the alternating combination of crotch carriers 20A and bucket carriers 20B shown in FIG. 1.

Figure 2:
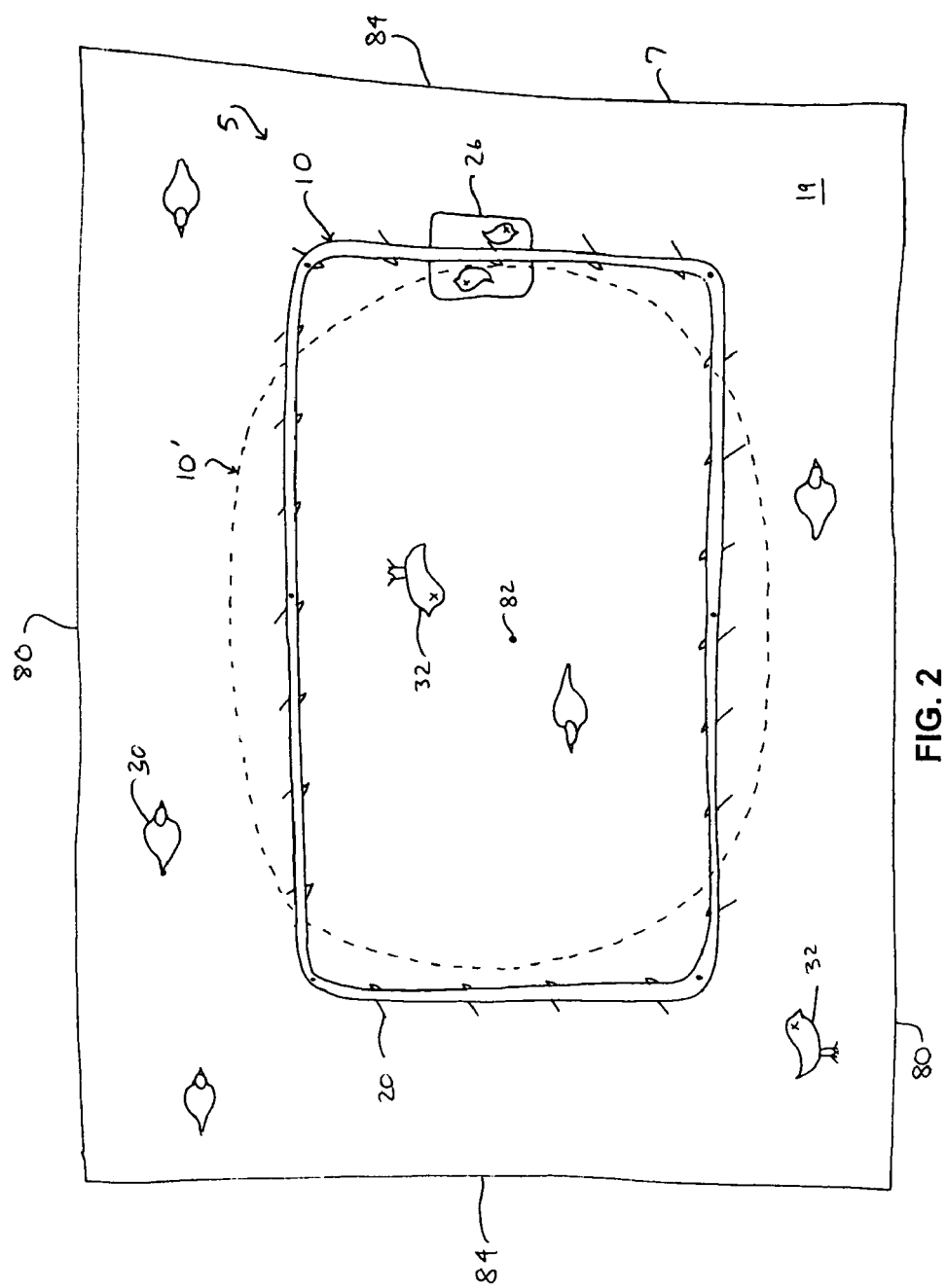
FIG. 2 is a top view of the embodiment shown in FIG. 1

FIG. 2 is a top view of conveyor 10 better illustrating conveyor 10 as a closed loop structure and conveyor's 10 placement within animal raising facility 7. As shown in FIG. 2, conveyor 10 has a generally rectangular shape generally corresponding to the shape of animal raising facility 7. Alternatively, as shown by ghost lines, conveyor 10' can be an oval or more rounded structure. The actual shape of conveyor 10 can be varied depending on a number of factors such as, for example, the shape of the animal raising facility, the materials of construction of the raceway 12 and chain or belt 56, and the whim of the owner. FIG. 2 also illustrates how carriers 20 can be staggered at generally equal distances along conveyor 10.

The physical placement of the system 5 within animal raising facility 7 also is shown illustratively in FIG. 2. Preferably, as facility 7 can be large (e.g. 60 ft by 500 ft) or small (10 ft by 50 ft), the system 5 is sized and placed such that the conveyor 10 is approximately equidistant between the central point 82 and the outer side walls 80 of the animal raising facility 7. As a typical animal raising facility 7 may be significantly longer than it is wide, the conveyor 10 can extend farther towards the end walls 84 than equidistant. This sizing and placement allows for convenient use in that the conveyor 10, and thus the carrier 20, is located a distance of no more than approximately one-quarter the width of the animal raising facility 7 from any dead animal 32. Additionally, the closed loop structure of conveyor 10 allows system 5 to be designed so to circulate and re-circulate carriers 20 around conveyor 10. Although conveyor 10, 10' is shown with a rectangular and oval shape, respectively, other embodiments can have other closed loop structures and shapes.

Figure 3A:
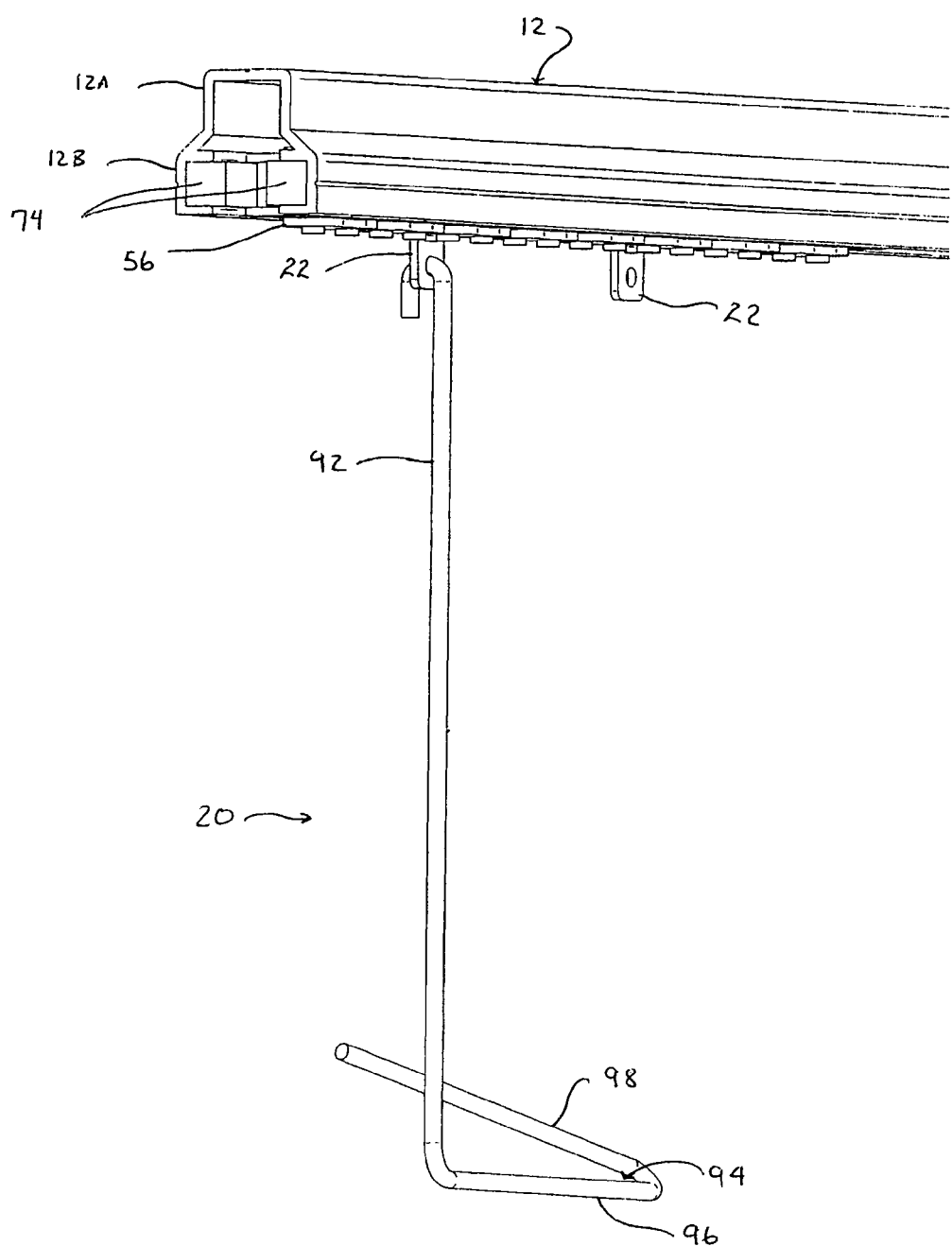
FIG. 3A is a perspective side view, partially in section, of the embodiment shown in FIG. 1 illustrating one embodiment of the chain or belt and one embodiment of the carrier.
Figure 3B:
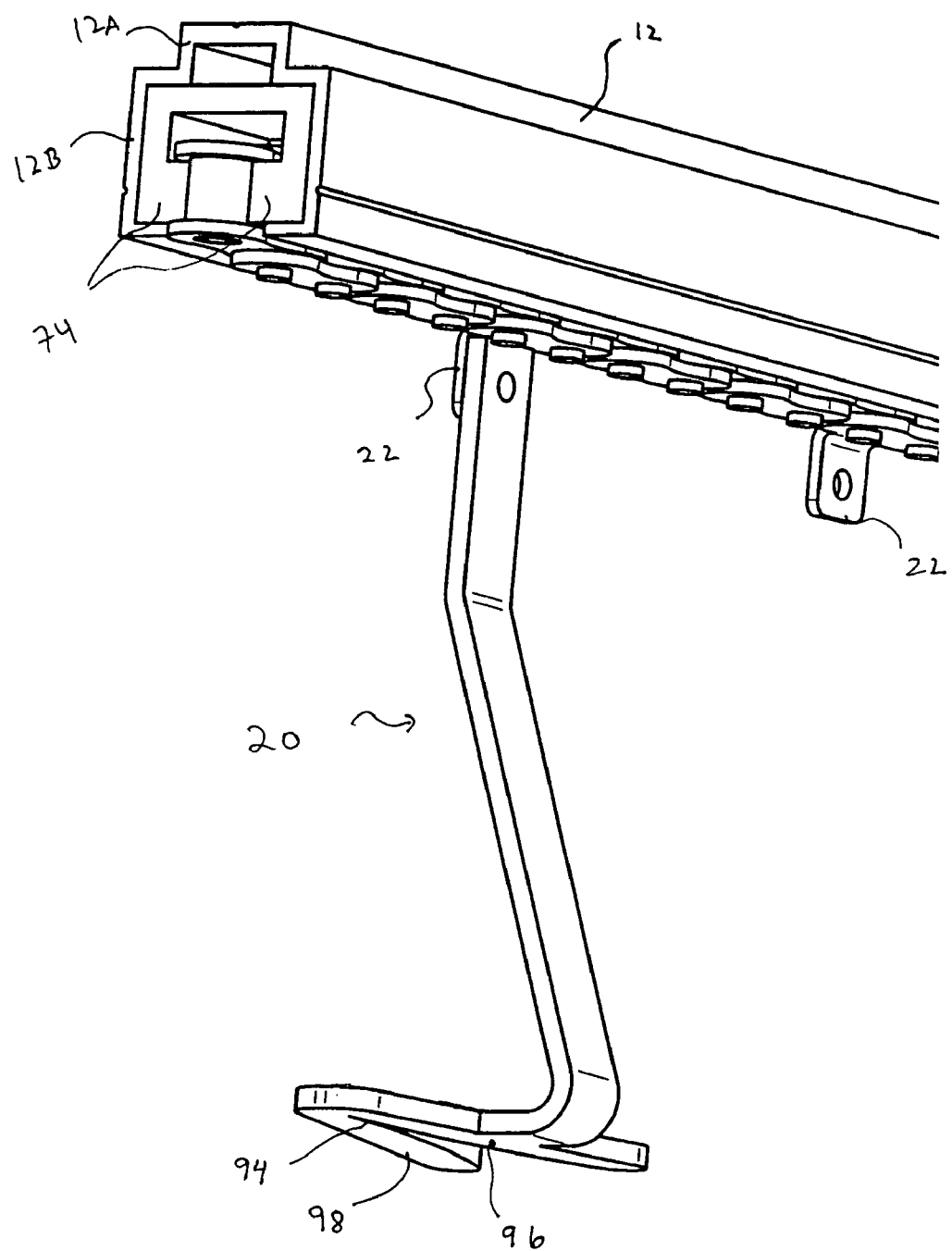
FIG. 3B is a perspective side view, partially in section, of the embodiment shown in FIG. 1 illustrating another embodiment of the carrier.

FIGS. 3A–B are side views, partially in section, of one embodiment of the operating portion of the system 5 showing some of the elements in more detail. Raceway 12 is a generally rigid structure capable of being suspended from the ceiling or wall 80, 84 or being supported above the floor 19 of the animal raising facility 7. In the illustrative embodiment shown in FIGS. 3A–B, raceway 12 has an upper half 12A that functions primarily to provide structural rigidity to raceway 12 and to provide a means for attaching suspension cables 62. Raceway 12 also has a lower half 12B for containing and guiding chain or belt 56, as disclosed in more detail below.

An illustrative chain or belt 56 is shown in FIG. 3 in which chain or belt 56 is a common motorcycle or bicycle type of roller chain 56. Chain 56 is formed as an endless loop within lower half 12B of raceway 12. Depending downward toward the ground 19 from chain 56 are attachment connectors 22 onto which carriers 20 are attached. In the example embodiment shown in FIG. 3A, the cooperation between connector 22 and carrier 20 allows carrier 20 to swing somewhat from side to side (perpendicular to the direction of motion of chain 56) and to swing significantly about 180 degrees or slightly more from forward to backward (parallel to the direction of motion of chain 56). The side to side motion allows the worker 60 to more easily load the carrier 20 with the dead animal 32 without harm to the worker 60 or the carrier 20. The forward to backward motion allows the carrier 20 to dump the dead animal 32 in the disposal site 26, as disclosed in more detail below.

In the example embodiment shown in FIG. 3B, the carrier 20 is connected to the connector 22 such that the carrier 20 cannot swing from side to side (perpendicular to the direction of motion of chain 56) or forward to backwards (parallel to the direction of motion of chain 56). The worker 60 can load the carrier 20 with the dead animal 32 without harm to the worker 60 or the carrier 20 by placing the dead animal 32 on the carrier 20 as described herein. Once the carrier 20 with the dead animal 32 passes over disposal site 26, the dead animal 32 is dumped at the disposal site 32.

Illustrative embodiments of carrier 20 are shown in FIGS. 3A–B in which carriers 20 are animal hangers. Such animal hangers are known in the art and comprise a receiving means for holding at least one dead animal 32. For example, in the embodiments shown in FIGS. 3A–B, the receiving means of carriers 20 is a shaped structure consisting of a generally vertical down piece 92 for suspending the carrier 20 from the chain or belt 56 and a generally horizontal crotch 94 having first angled or flat side 96 and second angled or flat side 98. Dead animals 32 can be placed in the crotch 94 by the legs or hocks or by the neck. As worker 60 uses the receiving means of carriers 20 to place the legs or hocks or neck of dead animal 32, the receiving means should have an opening (the space between first side 96 and second side 98 at the crotch 94) smaller than the diameter of the legs or hocks or neck of a typical dead animal 32. Such dimensions help prevent dead animal 32 from falling out of carrier 20 before arriving at disposal site 26.

Figure 4:
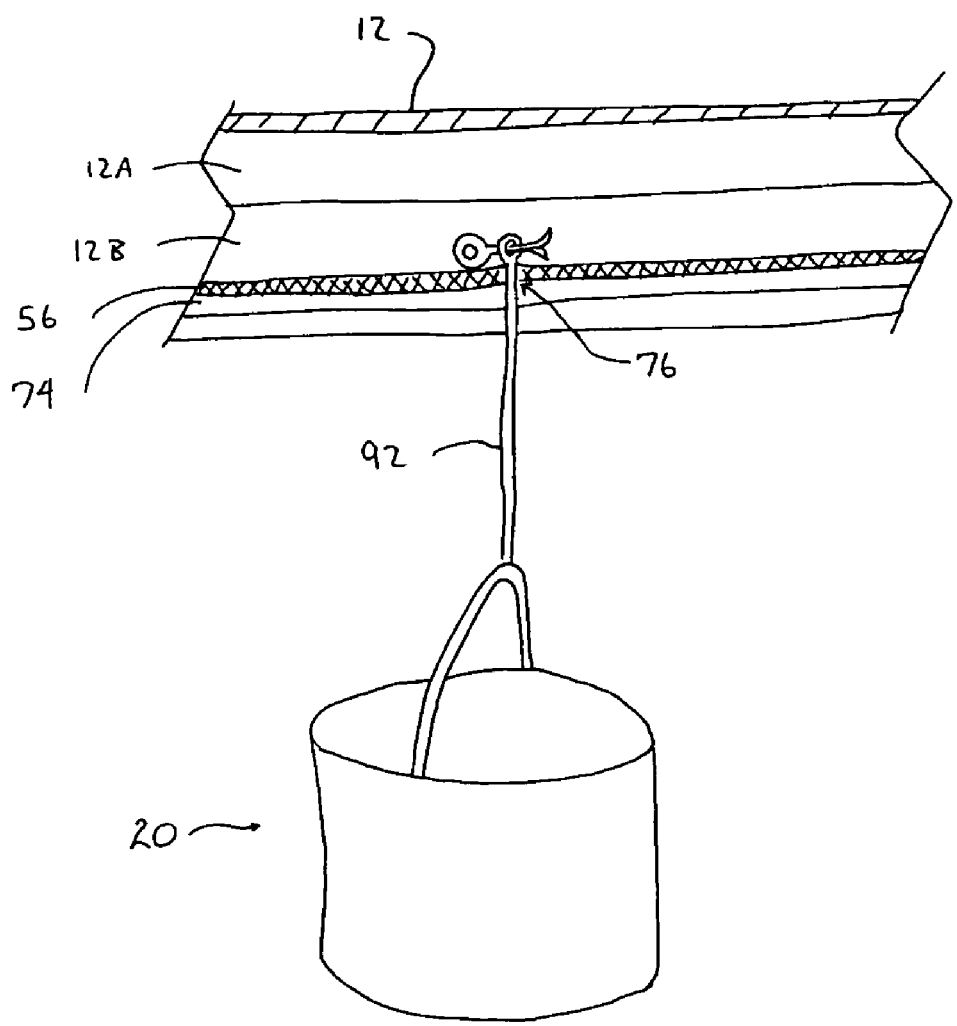
FIG. 4 is a side view, partially in section, of another embodiment of the present invention illustrating another embodiment of the chain or belt and another embodiment of the carrier.

FIG. 4 shows another embodiment of the present invention in which carriers 20 are buckets and chain or belt 56 is an automotive fan belt type of belt. In this alternative embodiment, carriers 20 can be ordinary buckets with receiving means capable of holding dead animal 32. Such buckets can be adapted to carry one or more dead animals 32. One of ordinary skill in the art can place dead animal 32 in carriers 20 shaped as buckets relatively easily. The belt 56 shown in FIG. 4 is of the materials and structure of a common automotive fan belt. Down rod 92 attaches between the bucket carrier 20 and the belt 56. The attachment between down rod 92 and belt 56 can be a connector 22 such as shown in FIG. 3, a receiving hole 76 through which down rod 92 extends and is pinned above, or the like. Such methods of attachment are determinable by those of ordinary skill in the art.

Figure 5:
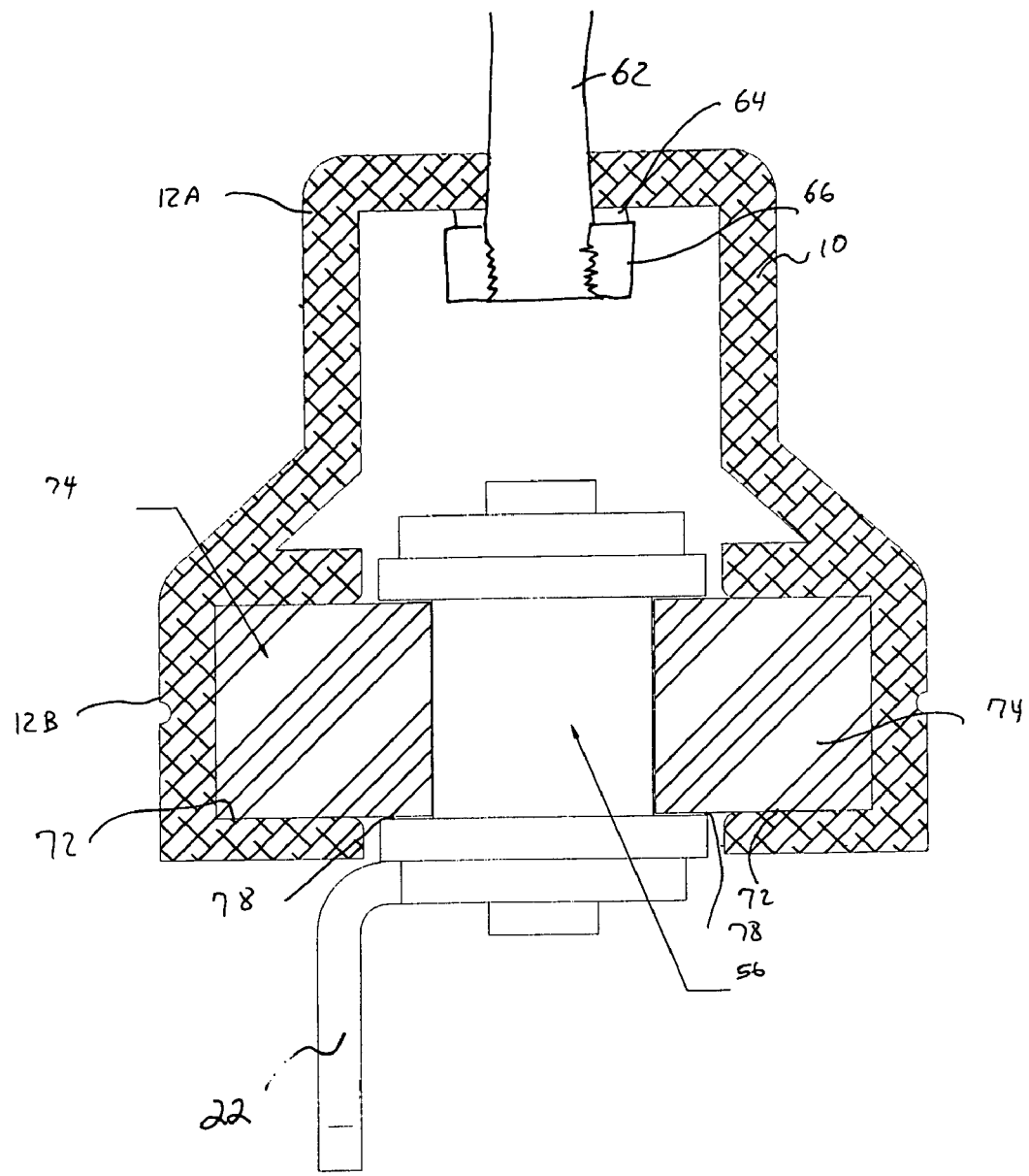
FIG. 5 is sectional view of the embodiment shown in FIG. 3.

FIG. 5 shows a sectional end view of the conveyor 10 raceway 12 in more detail. Raceway upper half 12A as illustrated has a generally square cross section to provide structural rigidity for the raceway 12 over the distances the conveyor is suspended or supported. Alternatively, raceway upper half 12A can be triangular in cross section, can be a single solid vertical beam, can be an I-beam structure, or can be any other structure providing the required strength and structural rigidity necessary to support raceway 12. In the example shown in FIG. 5, suspension cable 62 extends through a hole in the upper portion of raceway upper half 12A and is held in place using a washer 64 and nut 66.

Raceway lower half 12B is a generally hollow linear structure through which chain or belt 56 can travel as shown in FIG. 5. Chain or belt 56 is supported within raceway lower half 12B by wear strips 74 or similar devices that can provide the necessary retaining support for chain or belt 56 within raceway lower half 12B yet still allow chain or belt 56 to travel freely through raceway 12. Wear strips 74 are dimensioned to fit within and be supported by recesses 72 within raceway lower half 12B. Further, wear strips 74 also are dimensioned to fit within chain recesses 78, is a chain is used as the chain or belt 56, or to fit under belt, if a belt is used as the chain or belt 56. Thus, chain 56 can slide along wear strips 74 or belt 56 can slide on and above wear strips 74 as chain or belt 56 travels through raceway 12.

Wear strips 74 can be any suitable type of bearing or bearing type of support that will both support chain or belt 56 and allow chain or belt to travel through raceway 12. For example, wear strips 74 can be strips of Nylon®, ultra high molecular weight polymers, or other relatively rigid low friction materials or wear strips 74 can be roller bearings. Further, wear strips 74 can be a lubricated system, such as lubricating oil sitting directly on the bottom wall of raceway lower half 12B; however, it is preferable not to use oils in an animal raising facility 7. As such, the term wear strip 74 is defined to include all elements, devices, manufactures and machines that can both support chain or belt 56 and at the same time allow chain or belt 56 to travel through raceway 12.

Figure 6:
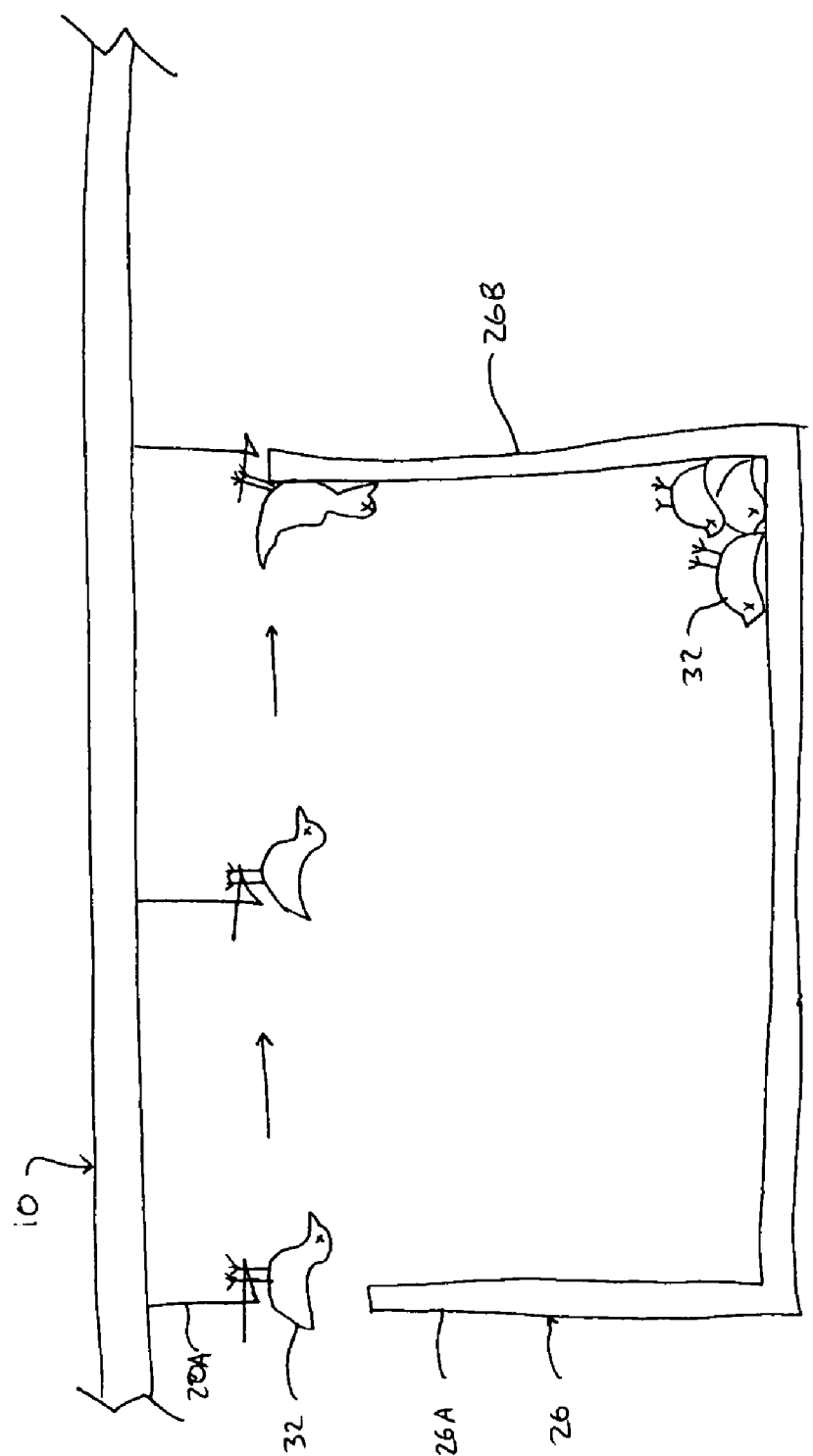
FIG. 6 is a side temporal view of the carrier dumping a dead animal into a first embodiment of a disposal site utilizing a bin or dumpster.

FIG. 6 shows a first illustrative embodiment for emptying carriers 20 over disposal site 26. In this first embodiment, disposal site 26 is a dumpster 26 having a front or upstream wall 26A lower than a rear or downstream wall 26B and carrier 20 is a crotch carrier 20A. Carriers 20 travel in the direction shown by the arrows. As crotch carrier 20A approaches and enters dumpster 26, crotch carrier 20A and dead animal 32 passes over upstream wall 26A. As crotch carrier 20A continues through dumpster 26, crotch carrier 20A passes over downstream wall 26B, but dead animal 32 does not. As dead animal 32 contacts downstream wall 26B, dead animal is knocked or pushed off of crotch carrier 20A and falls into dumpster 26. Crotch carrier 20A then continues around raceway 12 for further use.

Figure 7:
FIG. 7 is a side temporal view of the carrier dumping a dead animal into a second embodiment of a disposal site utilizing a bin or dumpster.

FIG. 7 shows a second illustrative embodiment for emptying carriers 20 over disposal site 26. In this second embodiment, disposal site 26 also is a dumpster 26 having a front or upstream wall 26A and a rear or downstream wall 26B and carrier 20 is a crotch carrier 20A. Carriers 20 travel in the direction shown by the arrows. As crotch carrier 20A approaches and enters dumpster 26, crotch carrier 20A and dead animal 32 contact pivot panel 102, causing dead animal 32 and crotch carrier 20A to pivot backwards in a plane parallel to the direction of travel of carrier 20. Crotch carrier 20B continues to pull dead animal over pivot wall 102 and at the end of pivot wall 102, dead animal 32 falls off of crotch carrier 20A into dumpster 26. Crotch carrier 20A then continues around raceway 12 for further use.

Figure 8:
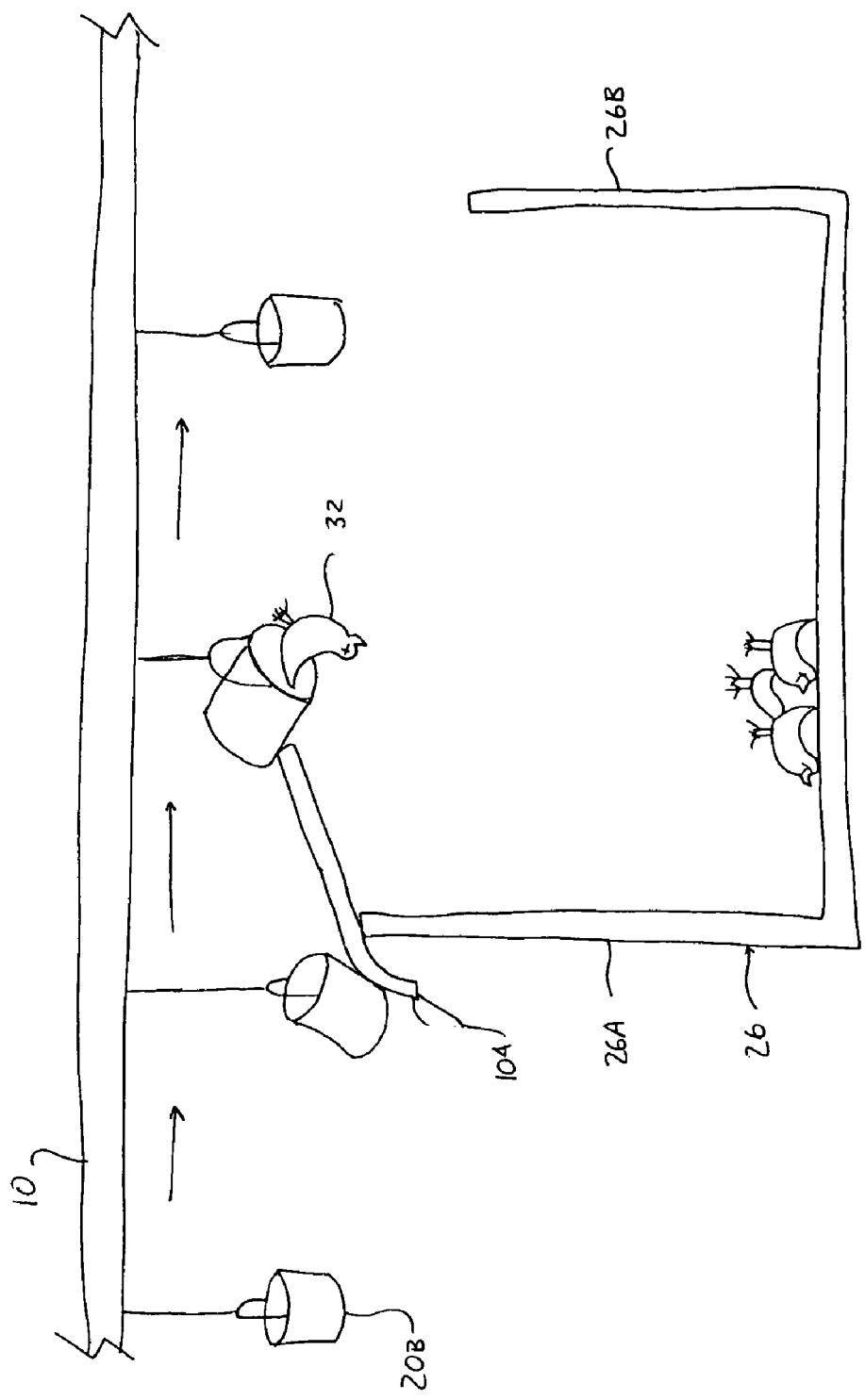
FIG. 8 is a side temporal view of the carrier dumping a dead animal into a third embodiment of a disposal site utilizing a bin or dumpster.

FIG. 8 shows a third illustrative embodiment of emptying carriers 20 over disposal site 26. In this third embodiment, disposal site 26 also is a dumpster having a front or upstream wall 26A and a rear or downstream wall 26B and carrier 20 is a bucket carrier 20B. Carriers 20 travel in the direction shown by the arrows. As bucket carrier 20 approaches and enters dumpster 26, bucket carrier 20B and dead animal 32 contact pivot panel 104, causing dead animal 32 and bucket carrier 20B to pivot backwards in a plane parallel to the direction of travel of carrier 20, thus turning the open end of bucket carrier 20B forwards and downwards towards the interior of dumpster 26. Dead animal 32 falls out of bucket carrier 20B into dumpster 26. Bucket carrier 20B then continues around raceway 12 for further use.

Preferably, carriers 20 are emptied over disposal site 26 and are vertical when not being emptied. As shown, carriers 20 are rotated between about 60 and 100 degrees to be emptied such that carriers 20 empty their contents. As each of carriers 20 progresses over disposal site 26, each of carriers 20 release their contents into disposal site 26. The continuous flow of conveyor 10 helps ensure that carriers 20 release their contents into disposal site 26 and that carriers 20 are available for worker 15 soon after.

Figure 9:
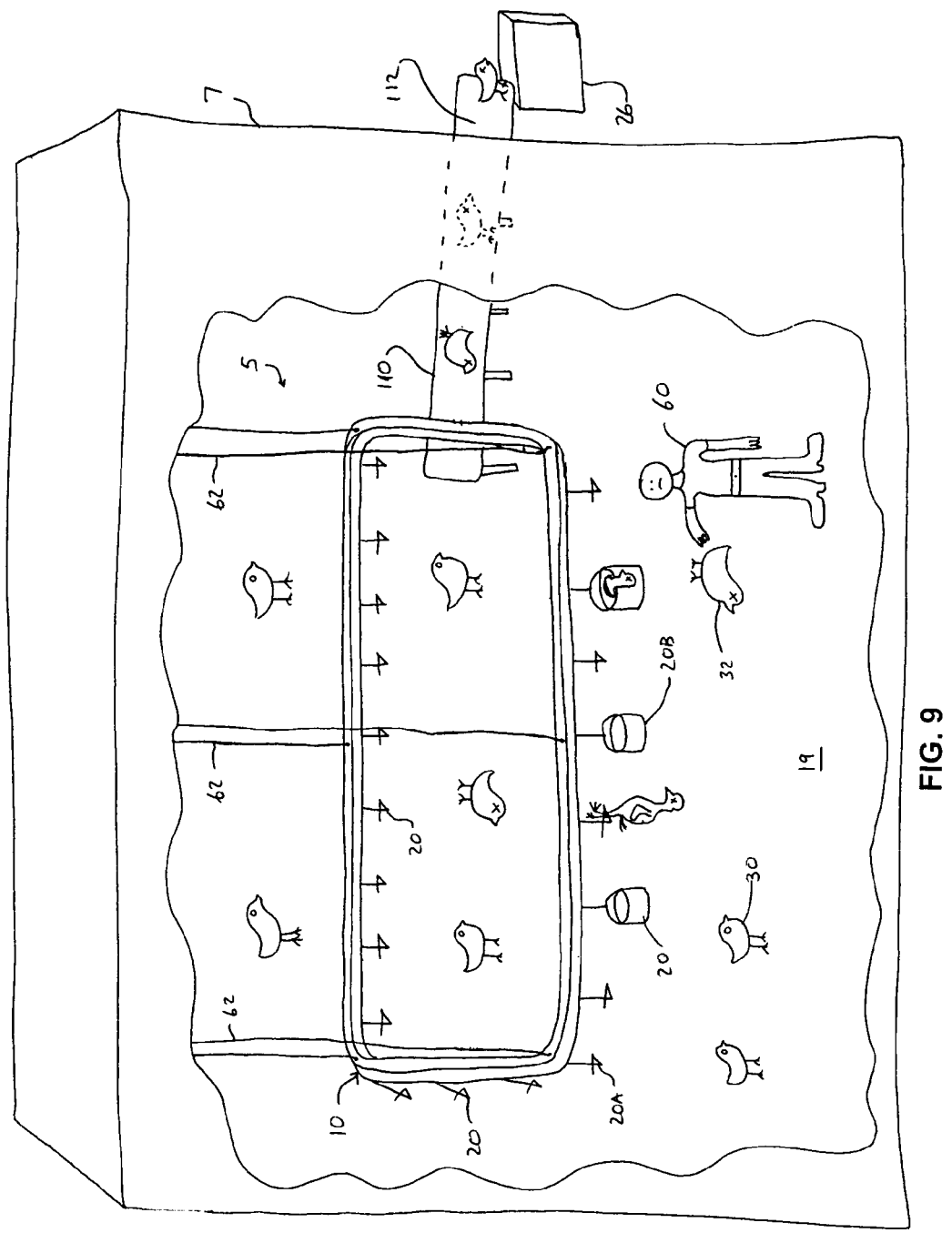
FIG. 9 is perspective view of an alternate embodiment of the present invention utilizing a conveyor as the disposal site.

FIG. 9 is perspective view of an alternate embodiment of the present invention 5 utilizing a removal conveyor 110 as the disposal site 26. In this embodiment, as carriers 20 approach disposal site 26, dead animals 32 are released from carriers 20 in any of the ways disclosed previously, as appropriate, and fall onto removal conveyor 110. Removal conveyor 110 is a known device comprising an endless horizontal belt 112 or the equivalent and transports dead animals 32 to a desired location. The desired location may be a distally located dumpster located inside of or outside of animal raising facility 7, a truck located outside of animal raising facility 7, or the like.

Figure 10:
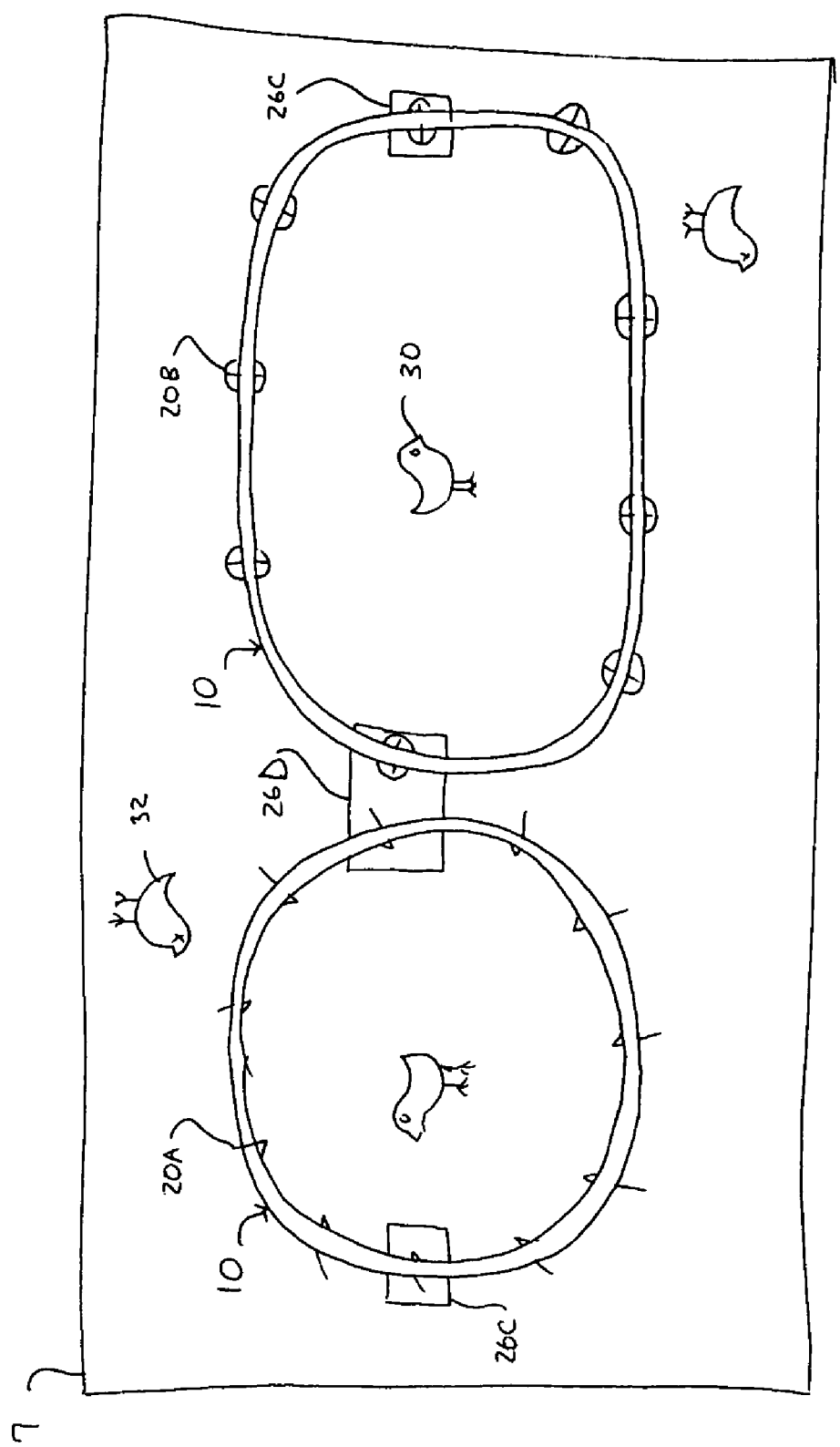
FIG. 10 is a top view of a dual conveyor embodiment of the present invention.

FIG. 10 is a top view of a dual conveyor 10 embodiment of the present invention 5. In this embodiment, two or more conveyors 10 are located within the animal raising facility 7, either having separate disposal sites 26C or sharing a disposal site 26D.

In operation and use, system 10 and method serve to efficiently transport dead animals 32 within an animal raising facility 7 to disposal bin 26. As worker 60 finds dead animal 32, worker 60 places dead animal 32 into on of circulating carriers 20, which travels along conveyor 10 until carrier 20 reaches deposal site 26. Once carrier 20 is at disposal site 26, carrier 21 is tipped or otherwise acted on and dead animal 32 is dumped into disposal site 26. After the dumping of dead animal 32 into disposal site 26, carrier 20 circulates along the conveyor 10 until the power to conveyor 10 is turned off. As the worker 60 does not need to transport dead animal 32 from the point of finding all the way to disposal site 26, time and energy is saved.

The system and method of the present invention can be employed in a conventional animal raising facility 7 with defined dimensions comprising a roof 24 supported by walls 80, 84 rising from the ground on floor 19. Such a system 10 and method can be employed within animal raising facility 7 of the type conventionally employed for growing commercially raised animals 30, which are disposed about floor 19 of animal raising facility 7. The system 10 and method as contemplated by the present invention may be installed within similar animal raising facilities 7 for use with a variety of animals.

Preferably, carriers 20 are at a height from floor 19 of animal raising facility 7 that allows live animal 30 to walk under carriers 20 without impedance. Further, carriers 20 should be a height so to allow worker 60 to place dead animals 32 into carrier 20 without unnecessary extra movements or strain. Preferably, most of the structure of conveyor 10 is distributed over the batch of animals as this maximizes the exposure of carriers 20 to worker 60.

Disposal site 26 can include an array of sites, bins, removal conveyors or other disposal means. For example, disposal site 26 can be an actual bin or dumpster for holding dead animals. Alternatively, disposal site 26 can be a truck or another conveyor that will transport dead animals 32 to a remote location. Preferably, disposal site 26 can be a site for dumping dead animals 32, which is away from the batch of live animals 30. As such, the term site is defined and used as a location, a structure, a device or a machine for receiving dead animals 32.

One of ordinary skill in the art can develop without undue experimentation an acceptable conveyor 10 suitable with system 5. The complexity of conveyer 10 can range from a simple conveyor with a minimum number of moving parts to complex conveyor with numerous moving parts and features. One example of an adaptable conveyor system is shown in U.S. Pat. No. 5,105,933 to Gough. Other types of conveyors are obvious to those with ordinary skill in the art and can be employed without undue experimentation.

The driving means for conveyor 10 can be in the formed of a powered motor and gearbox, which are operatively connected to the chain or belt 56, such that the conveyor 10 may be advanced in a controlled fashion. Motor preferably can be at advanced by at least one speed. In such an embodiment, the conveyor 10 may be selectively advanced at a relatively rapid rate of speed or at a slower speed forwardly to facilitate the transport of dead animals 32 to disposal site 26. Preferably, the rate of speed is not excessively fast so to make it difficult for worker 60 to place dead animals 32 in carriers 20 or excessively slow to reduce the efficiency of the system 10 and method.

The dimensions of conveyor 10 can depend on size of animal raising facility 7 in which system 5 is being employed. For example, in a large animal raising facility 7, it may be appropriate to have a larger conveyor 10. In a smaller animal raising facility 7, it may be appropriate to have a smaller conveyor 10. As part of conveyor 10 can be designed to be outside animal raising facility 7, preferably when the disposal site 26 is located outside the animal raising facility 7, conveyor 10 in some embodiments may be larger (longer) than animal raising facility 7. One of ordinary skill in the art can selected the dimensions of conveyor 10 for a specific animal raising facility 7 without undue experimentation.

The numbers of carriers 20 shown and described herein are for illustrative purposes. The actual number of carriers 20 used with the present invention can be substantially varied and will depend on numerous factors including the size of the animal raising facility 7, the dimensions of conveyor 10 and the desired spacing between carriers 20. One of ordinary skill in the art can select the number of carriers 20 to be used with system 5 without undue experimentation.

The material of construction of the components of system 10 can be numerous including carbon steel, abrasive resistant steel, stainless steel, other metals (such as aluminum), plastics and other polymers, ceramics, fiber reinforced plastics and ceramics, or any other material appropriate for the specific component. For example, bucket carriers 20 can be constructed from plastic (e.g. injection molded plastics) or hard rubber and crotch carriers 20 can be constructed from stainless steel rods, flat metals, or plastics. Lightweight materials can be used for carriers 20 to reduce to the weight to be moved by motor. One of ordinary skill in the art can select a material without undue experimentation.

The above detailed description of the preferred embodiments, examples, and the appended figures are for illustrative purposes only and are not intended to limit the scope and spirit of the invention, and its equivalents, as defined by the appended claims. One skilled in the art will recognize that many variations can be made to the invention disclosed in this specification without departing from the scope and spirit of the invention.

What is claimed is:

1. A system to maintain a healthier environment in an animal raising facility for live animals by facilitating the removing of unprocessed dead animals found therein, consisting of:
    a) a conveyance system for transporting the dead animals from within the live animal facility to a disposal site for receiving and storing the dead animals, the conveyance system comprising
        (i) a frame having a uniformly horizontal operating platform with a channel,
        (ii) a continuous conveyor chain or belt located in the channel, and
        (iii) a plurality of spaced carriers depending from and secured to the conveyor chain or belt, wherein the conveyor forms a closed loop within the live animal raising facility and the plurality of spaced carriers are attached at defined positions along the conveyor for receiving the dead animals, and wherein each of the carriers can receive and convey one of the dead animals; and
    b) means located at the disposal site for removing the dead animals from the carriers into the disposal site,
    wherein the disposal site is outside of the animal raising facility, the carriers are suitable for the unprocessed dead animals; the carriers are selected from the group consisting of buckets and hangers; the conveyor system is suspended from the ceiling of the animal raising facility at a height that does not interfere with the activities of the resident live animals; and the conveyor has a shape corresponding to the shape of the live animal raising facility on a single floor.

2. The system as claimed in claim 1, wherein the disposal site is a disposal bin.

3. The system as claimed in claim 1, wherein the dead animals are not for human consumption.

* * * * *